United States Patent [19]

Tsukahara et al.

[11] 4,268,634
[45] May 19, 1981

[54] DESENSITIZER FOR NO-CARBON COPY PAPER

[75] Inventors: Hirokazu Tsukahara; Mitsuru Fuchigami; Nobuhiro Kagota, all of Takasago, Japan

[73] Assignee: Mitsubishi Paper Mills, Ltd., Tokyo, Japan

[21] Appl. No.: 863,951

[22] Filed: Dec. 23, 1977

[30] Foreign Application Priority Data

Jan. 17, 1977 [JP] Japan .................................. 52-3826
Feb. 2, 1977 [JP] Japan .................................. 52-10543

[51] Int. Cl.² .................. B41M 5/16; C08L 61/00
[52] U.S. Cl. .................................. 525/471; 101/465;
106/2; 282/27.5; 427/150; 427/151; 428/307;
428/914; 525/418; 525/440; 525/452; 525/502
[58] Field of Search ............. 560/221, 104; 106/2,
106/14.5, 20, 21, 22, 23; 96/115 R, 115 P, 28;
260/18 EP, 828, 859 R, 836, 837; 282/27.5;
525/418, 502, 440, 452, 471

[56] References Cited

U.S. PATENT DOCUMENTS 2,760,863  8/1956  Plambeck, Jr. ................... 96/35.1
3,060,023  10/1962  Burg et al. ......................... 96/28
3,732,105  5/1973  Klupfel et al. ..................... 96/115 P

*Primary Examiner*—J. Ziegler
*Attorney, Agent, or Firm*—Cushman, Darby & Cushman

[57] ABSTRACT

There is provided a desensitizer used in a quick-drying desensitizing ink for no-carbon copy paper, which is a compound represented by the formula

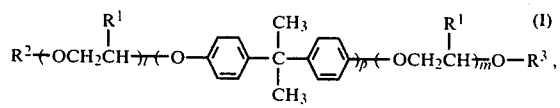

wherein $R^1$ represents hydrogen atom or methyl group; $R^2$ represents hydrogen atom, a methyl group, a phenyl group which may have as substituent an alkyl group having 1 to 12 carbon atoms,

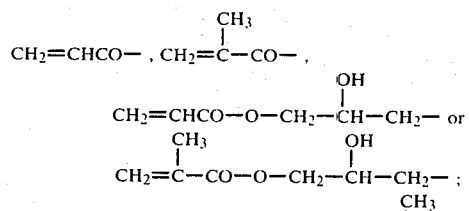

$R^3$ represents

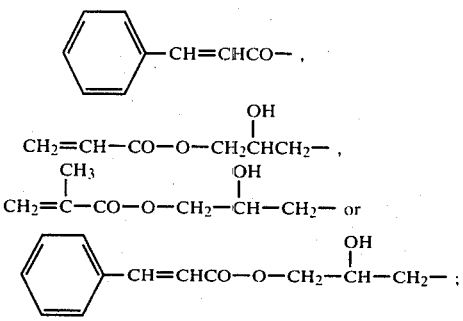

and l and m are integers of 1 or greater than 1, l+m being not greater than 46, and p is zero or an integer of 1, provided that when p is zero $R^2$ is the groups other than

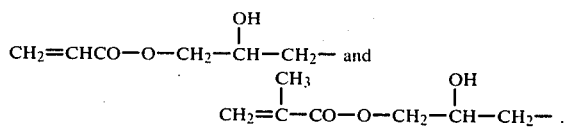

2 Claims, No Drawings

DESENSITIZER FOR NO-CARBON COPY PAPER

This invention relates to a desensitizer which, when used in a no-carbon pressure-sensitive copy paper system utilizing a combination of an electron-donating colorless organic compound and an electron-accepting compound or a solid acid, acts to prevent color development even if said electron-donating colorless organic compound and said electron-accepting compound or said solid acid come into contact.

No-carbon copy paper generally consists of a combination of a top sheet coated with microcapsules enclosing a solution of an electron-donating leuco dye such as crystal violet lactone, benzoyl-leuco-methylene blue, malachite green lactone, rhodamine anilinolactam, or the like, in a nonvolatile oil and an under sheet coated with an electron-accepting substance or solid acid such as activated clay, acid clay, attapulgite, a phenolic resin, a polyvalent metal salt of a salicylic acid derivative, or the like, together with a suitable binder. When both sheets are placed face to face and a marking pressure is applied by hand- or type-writing, the microcapsules are ruptured at points under pressure and the leuco dye and the solid acid come into contact to develop a color image. Manifold copies can be produced by interlaying between the top sheet and the under sheet intermediate sheets coated with a solid acid on the top side and microcapsules containing a leuco dye on the back.

Desensitizers have been customarily applied to the copy paper either as a precoat to prevent color forming in undesired areas or as a post-coat to eliminate the developed images in undesired areas.

Examples of conventionally known desensitizers include cationic quaternary ammonium salts (for example, dodecyltrimethylammonium chloride), aliphatic amine acetates (for example, n-dodecylamine acetate), higher aliphatic amines (for example, dodecyldiamine), and oxazoline derivatives (for example, 2,4,4-trimethyl-2-oxazoline) disclosed in Japanese Patent Publication No. 3,921/58; tertiary amines having two polyethylene oxide groups (for example, N,N-dipolyoxyethyleneethylamine) in Japanese Patent Publication No. 29,546/71; polyoxyethylene monoalkyl esters [general formula, $RCOO(C_2H_4O)_mH$, where R is an alkyl group having 12 to 18 carbon atoms; for example, polyoxyethylene oleyl ester] in Japanese Patent Publication No. 38,201/72; propylene oxide adducts of alkylenediamines (for example, polyoxypropylenediethylamine) in Japanese Patent Publication No. 23,850/74; poly-γ-alkyl glutamates in Japanese Patent Publication No. 4,484/74; ethylene oxide adducts of polyamines in Japanese Patent Publication No. 23,008/74; amine-glycidyl esters (or ethers) addition products in Japanese patent application "Kokai" (Laid-open) No. 72,009/74; polypropylene glycols in Japanese patent application "Kokai" (Laid-open) No. 37,507/75; and alkyl- or arylamine-propylene oxide-ethylene oxide co-addition products in Japanese patent application "Kokai" (Laid-open) No. 84,318/75. Almost all of these substances are organic compounds of relatively high molecular weights (generally greater than several hundreds) containing in their molecules polyether linkages such as polyethylene oxide and polypropylene oxide.

In order to prevent color development by applying a desensitizer to the surfaces of intermediate and under sheets of no-carbon copy paper which have been coated with an acidic substance (developer), it is general practive to coat the surfaces with a composition containing the desensitizer (i.e. a desensitizing ink) in predetermined patterns by suitable printing processes. This printing is performed most frequently by means of a letterpress printing machine using a desensitizing ink comprising a desensitizer, pigment, vehicle, etc. However, since such a desensitizing ink is a penetration-drying type, it has a disadvantage of slow-drying which makes difficult the speed-up of printing.

On the other hand, because of remarkable improvement in the color-forming property brought about by the recent progress in the dyes and acid substances (developers), the desensitizing effect of a printed desensitizing ink has become less marked than in the previous time and it has become necessary to increase the amount of ink deposit (amount of ink applied per unit area) in order to secure a sufficient desensitizing effect. The increase in the amount of ink deposit adversely affects drying speed of the ink and leads to increased printing troubles.

As for the developer, activated clay which has long been used has a large surface area and, hence, a relatively good absorption capacity for the ink, whereas phenolic resins and salicylic acid derivatives, which are increasingly used in recent years, have no ink absorptive capacity by themselves so that a special stress is put on drying speed of the desensitizing ink.

Meanwhile, recent progress in printing machinery is also noteworthy, particularly in printing speed, and printed no-carbon copy paper is consumed more and more every year.

Under the circumstances, in order to meet a strong request for the improvement in printing speed and efficiency on the part of desensitizing ink, early development of a quick-drying desensitizing ink and of a printing system with such an ink is eagerly awaited.

As a measure to satisfy the above-mentioned needs, it is conceivable to apply to the technical domain of desensitizing ink printing a photocure drying system with an ultraviolet-curable printing ink which has been already employed in the field of monochrome or multicolor printing.

The ultraviolet-curable printing ink is produced, as disclosed in British Pat. No. 1,198,259, by incorporating a coloring pigment or dye in a "photosensitive vehicle" consisting essentially of a photopolymerizable unsaturated monomer and a photoinitiator (in practice, such an ink contains, in addition to said essential components, a resin, chain transfer agent, polymerization inhibitor, solvent, etc.).

Accordingly, it might be considered possible to obtain an ultraviolet-curable desensitizing ink by incorporating a "photosensitive vehicle" with a compound which has been known to be of an excellent desensitizing property (i.e. a desensitizer), such as those many unpolymerizable compounds having no unsaturated group which were mentioned before. However, since a desensitizing ink normally contains 30% by weight or more of a desensitizer which is usually a liquid, the said ultraviolet-curable ink will end in undesirable one from the standpoint of photocuring or ultraviolet-drying, owing to excessive dilution with a nonpolymerizable desensitizer. The drying speed of such an ink will be decreased still more, if an additional component (for example, a white pigment such as titanium oxide which is usually used in the desensitizing ink) is added to enhance the product utility.

This invention provides for the first time a desensitizer having a photosensitive unsaturated group, in place of a conventionally known unpolymerizable desensitizer, and thus makes it possible to eliminate the foregoing disadvantages. On account of the susceptibility to polymerization of the desensitizer itself, the drying speed of the present desensitizing ink reaches so high a level as never been attained with conventional desensitizing inks.

Conventional desensitizing inks have the following additional disadvantages: Unless the desensitizer has a molecular weight of 500 or more, unprinted areas sometimes become desensitized due to migration of the desensitizer [Japanese patent application "Kokai" (Laid-open) No. 32,915/72]; in spite of a quite large molecular weight, migration is likely to take place when the application rate of the ink is large or the applied areas are exposed to heat or humid air; and owing to the presence of a liquid desensitizer (or a varnish containing a desensitizer) on the surface of paper, letters and figures written or stamped with a ball-point pen, fountain pen, or stamp ink on the portion of paper where the desensitizing ink has been applied become blurred by feathering.

An object of this invention is to provide a new desensitizer which is used in a quick-drying desensitizing ink.

Another object of this invention is to provide a desensitizing ink for no-carbon copy paper in which a phenolic resin or a derivative of salicylic acid is used as developer.

A further object of this invention is to provide a desensitizing ink useful in manufacturing no-carbon copy paper by the printing process.

In order to achieve above objects, the present inventors conducted extensive studies and, as a result, found that polyalkylene oxide having ethylenically unsaturated bonds at the terminals of its molecular chain readily polymerizes, thus acting as a quick-drying desensitizer. Based on this finding, the present invention has been accomplished.

According to this invention, there is provided a desensitizer for no-carbon copy paper, characterized in that the desensitizer is a compound represented by the formula

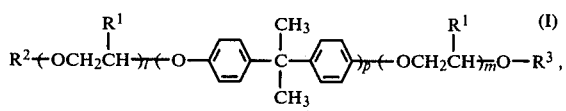

wherein $R^1$ represents hydrogen atom or methyl group; $R^2$ represents hydrogen atom, a methyl group, a phenyl group which may have as substituent an alkyl group having 1 to 12 carbon atoms,

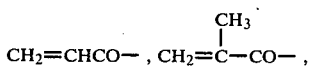

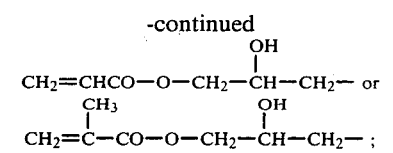

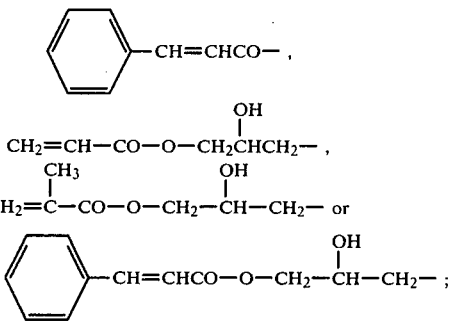

$R^3$ represents $CH_2=CHCO-$, $CH_2=\overset{CH_3}{\underset{|}{C}}-CO-$, and l and m are integers of 1 or greater than 1, l+m being not greater than 46, and p is 0 or an integer of 1, provided that when p is zero $R^2$ is the groups other than

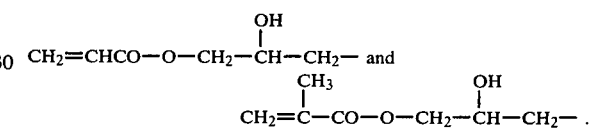

The desensitizer according to this invention is cured to nearly solid state after having been printed on paper, so that there are no troubles such as migration of the desensitizer and feathering of the ink; one of the merits of the present invention is utilization of even a low molecular weight compound as a desensitizer.

The present desensitizers can be used each alone or as a mixture of two or more. The desensitizing ink can be produced from the present desensitizers in the form of either monomer or prepolymer prepared by polymerization of single compound, a mixture of two or more compounds, or a mixture with other types of monomers (for example, acrylic acid, methacrylic acid, and the like). A reaction product of the hydrophilic hydroxyl group which is seen in $R^2$ and $R^3$ of the formula (I) with a reactive compound (for example, a compound having an isocyanate group) can be used in manufacturing an offset printing ink.

A suitable proportion of the desensitizer in the solids of a desensitizing ink is 25 to 80% by weight. Desensitizing inks containing pigments, resins, and other varnish additives can be prepared by known methods.

Of the compounds used in the present invention, the most preferable is a compound having the following formula:

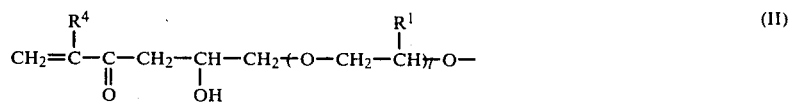

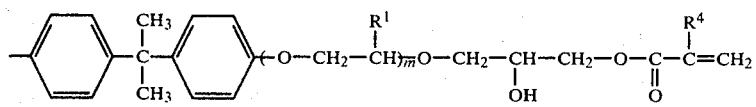

wherein $R^1$ is same as defined above; $R^4$ is a hydrogen atom or a methyl group, and l and m are same as defined above. The second preferable is a compound having the following formula:

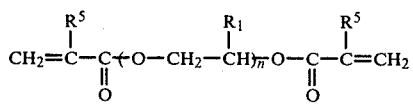
(III)

wherein $R^1$ is same as defined above, $R^5$ is a hydrogen atom or a methyl group, and n is an integer of 2 to 23; or a compound having the following formula;

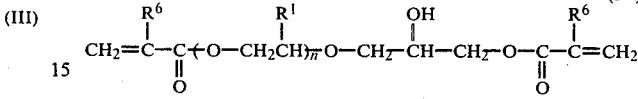
(IV)

wherein $R^1$ is same as defined above, $R^6$ is a hydrogen atom or a methyl group, and n is same as defined above.

Examples of individual compounds used as the desensitizers according to this invention are as follows:

| Compound No. | Chemical structural formula |
|---|---|
| 1 | 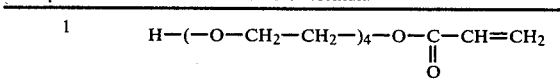 |
| 2 | 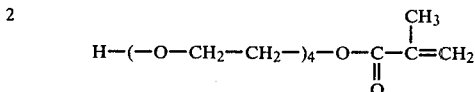 |
| 3 | 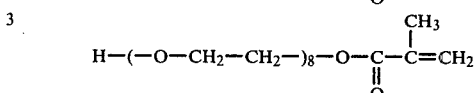 |
| 4 | 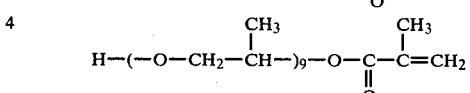 |
| 5 | 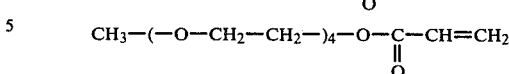 |
| 6 | 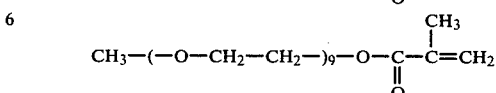 |
| 7 | 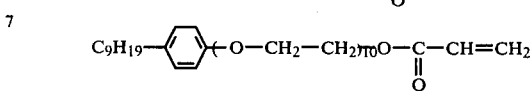 |
| 8 | 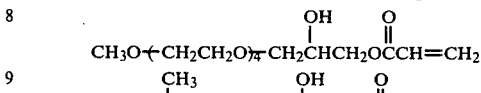 |
| 9 | 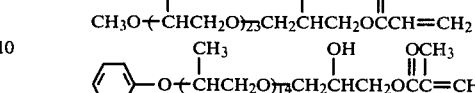 |
| 10 |  |
| 11 | 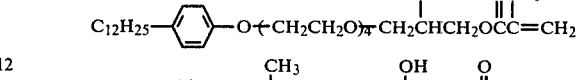 |
| 12 | 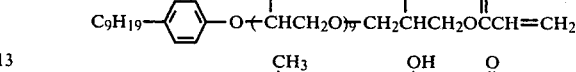 |
| 13 | 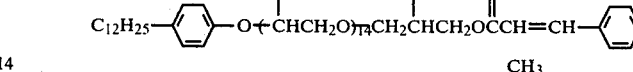 |
| 14 | 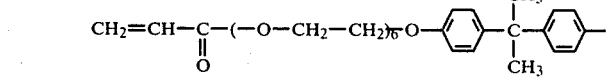 |

| Compound No. | Chemical structural formula |
|---|---|
| | $-O-(-CH_2-CH_2-O)_{\overline{6}}\overset{O}{\underset{\|}{C}}-CH=CH_2$ |
| 15 | $CH_2=\overset{CH_3}{\underset{\|}{C}}-\overset{O}{\underset{\|}{C}}(O-CH_2-CH_2)_{\overline{7}}O-\underset{CH_3}{\overset{CH_3}{\underset{\|}{\overset{\|}{C}}}}\text{—Ar—Ar—}$ |
| | $-O-(CH_2-CH_2-O)_{\overline{7}}\overset{O}{\underset{\|}{C}}-\overset{CH_3}{\underset{\|}{C}}=CH_2$ |
| 16 | $\text{Ph}-CH=CH\overset{O}{\underset{\|}{C}}OCH_2\overset{OH}{\underset{\|}{C}}HCH_2-O(CH_2CH_2O)_{\overline{4}}\text{—Ar—}\underset{CH_3}{\overset{CH_3}{\underset{\|}{\overset{\|}{C}}}}-$ |
| | $\text{—Ar—}O(CH_2CH_2O)_{\overline{4}}CH_2\overset{OH}{\underset{\|}{C}}HCH_2O\overset{O}{\underset{\|}{C}}CH=CH\text{—Ph}$ |
| 17 | $CH_2=CH-\overset{O}{\underset{\|}{C}}(O-CH_2-CH_2)_{\overline{4}}O-\overset{O}{\underset{\|}{C}}-CH=CH_2$ |
| 18 | $CH_2=CH-\overset{O}{\underset{\|}{C}}(O-CH_2-CH_2)_{\overline{9}}O-\overset{O}{\underset{\|}{C}}-CH=CH_2$ |
| 19 | $CH_2=CH-\overset{O}{\underset{\|}{C}}(O-CH_2-CH_2)_{\overline{13}}O-\overset{O}{\underset{\|}{C}}-CH=CH_2$ |
| 20 | $CH_2=\overset{CH_3}{\underset{\|}{C}}-\overset{O}{\underset{\|}{C}}(O-CH_2-CH_2)_{\overline{9}}O-\overset{O}{\underset{\|}{C}}-\overset{CH_3}{\underset{\|}{C}}=CH_2$ |
| 21 | $CH_2=\overset{CH_3}{\underset{\|}{C}}-\overset{O}{\underset{\|}{C}}(O-CH_2-CH_2)_{\overline{14}}O-\overset{O}{\underset{\|}{C}}-\overset{CH_3}{\underset{\|}{C}}=CH_2$ |
| 22 | $CH_2=\overset{CH_3}{\underset{\|}{C}}-\overset{O}{\underset{\|}{C}}(O-CH_2-CH_2)_{\overline{23}}O-\overset{O}{\underset{\|}{C}}-\overset{CH_3}{\underset{\|}{C}}=CH_2$ |
| 23 | $CH_2=CH-\overset{O}{\underset{\|}{C}}(O-CH_2-\overset{CH_3}{\underset{\|}{CH}})_{\overline{7}}O-\overset{O}{\underset{\|}{C}}-CH=CH_2$ |
| 24 | $CH_2=\overset{CH_3}{\underset{\|}{C}}-\overset{O}{\underset{\|}{C}}(O-CH_2-\overset{CH_3}{\underset{\|}{CH}})_{\overline{7}}O-\overset{O}{\underset{\|}{C}}-\overset{CH_3}{\underset{\|}{C}}=CH_2$ |
| 25 | $CH_2=\overset{CH_3}{\underset{\|}{C}}-\overset{O}{\underset{\|}{C}}(O-CH_2-\overset{CH_3}{\underset{\|}{CH}})_{\overline{12}}O-\overset{O}{\underset{\|}{C}}-\overset{CH_3}{\underset{\|}{C}}=CH_2$ |
| 26 | $CH_2=\overset{CH_3}{\underset{\|}{C}}-\overset{O}{\underset{\|}{C}}(OCH_2\overset{CH_3}{\underset{\|}{CH}})_{\overline{23}}O\overset{O}{\underset{\|}{C}}-\overset{CH_3}{\underset{\|}{C}}=CH_2$ |
| 27 | $CH_2=CH\overset{O}{\underset{\|}{C}}OCH_2\overset{OH}{\underset{\|}{C}}HCH_2-O(\overset{CH_3}{\underset{\|}{C}}HCH_2O)_{\overline{9}}\text{—Ar—}\underset{CH_3}{\overset{CH_3}{\underset{\|}{\overset{\|}{C}}}}\text{—Ar—}$ |
| | $-O(\overset{CH_3}{\underset{\|}{C}}HCH_2O)_{\overline{7}}CH_2\overset{OH}{\underset{\|}{C}}HCH_2O\overset{O}{\underset{\|}{C}}CH=CH_2$ |
| 28 | $CH_2=CH\overset{O}{\underset{\|}{C}}OCH_2\overset{OH}{\underset{\|}{C}}HCH_2-O(CH_2CH_2O)_{\overline{4}}\text{—Ar—}\underset{CH_3}{\overset{CH_3}{\underset{\|}{\overset{\|}{C}}}}-$ |
| | $\text{—Ar—}O(CH_2CH_2O)_{\overline{4}}CH_2\overset{OH}{\underset{\|}{C}}HCH_2O\overset{O}{\underset{\|}{C}}CH=CH_2$ |
| 29 | $CH_2=\overset{CH_3}{\underset{\|}{C}}-\overset{O}{\underset{\|}{C}}-OCH_2\overset{OH}{\underset{\|}{C}}HCH_2-O(CH_2CH_2O)_{\overline{9}}\text{—Ar—}\underset{CH_3}{\overset{CH_3}{\underset{\|}{\overset{\|}{C}}}}-$ |

-continued

| Compound No. | Chemical structural formula |
|---|---|

Compound 30:

$$-\bigcirc-O(CH_2CH_2O)_{\overline{37}}CH_2CHCH_2OC-C=CH_2$$
with OH, O, CH$_3$ substituents $$CH_2=C(CH_3)-COCH_2CHCH_2-O(CHCH_2O)_{\overline{23}}\bigcirc-C(CH_3)_2-$$

$$-\bigcirc-O(CHCH_2O)_{\overline{23}}CH_2CHCH_2OC-C=CH_2$$
with CH$_3$, OH, O, CH$_3$ substituents Compound 31:

$$CH_2=C(CH_3)-COCH_2CHCH_2-O(CHCH_2O)_{\overline{14}}\bigcirc-C(CH_3)_2-$$

$$-\bigcirc-O(CHCH_2O)_{\overline{14}}CH_2CHCH_2OC-C=CH_2$$

Compound 32:

$$CH_3CH=CHCOCH_2CHCH_2-O(CHCH_2O)_{\overline{37}}\bigcirc-C(CH_3)_2-$$

$$-\bigcirc-O(CHCH_2O)_{\overline{37}}CH_2CHCH_2OCCH=CHCH_3$$

Embodiment of the present invention by use of the novel desensitizers listed above is possible in various cases as shown below.

Case 1

The present desensitizers are used in place of conventional ones.

1-1

Desensitizing ink of the customary type (to be used in conventional printing system without utilizing ultraviolet curing).

1-2

Ultraviolet-curable desensitizing ink containing an ultraviolet-curable vehicle (photosensitive vehicle).

Case 2

Ultraviolet-curable desensitizing ink containing the present desensitizers as ultraviolet-curable vehicle (photosensitive monomer or photosensitive prepolymer) as well as desensitizer.

In each case, the present polyoxyalkylene-type desensitizers having ethylenically unsaturated groups exhibit a remarkable accelerating effect on drying of the ink and, at the same time, satisfactory desensitizing characteristics. They show prominent practical value especially in the cases 1-2 and 2.

Though the desensitizing ink containing the present desensitizer can be used in any printing system, it displays a remarkable effect particularly when used in the ultraviolet cure printing system.

The present desensitizer can be used in a desensitizing composition and applied to paper in a manner similar to that in the case of a conventional desensitizer without any particular restriction. For example, it is dissolved in a solvent such as an alcohol or the like to form a flexographic or gravure ink or it is formulated in the form of ink suitable for use in letterpress or offset printing and the resulting solution or ink can be applied by coating or printing, respectively, to the no-carbon copy paper surface coated with an electron-accepting compound or solid acid. As mentioned before, the characteristic features of the present invention are most favorably manifested when the present desensitizer is used in the ultraviolet cure printing system.

Even when the present desensitizer is used in a customary printing system without utilizing ultraviolet drying, the drying reaction of the ink continues to proceed even after printing on exposure to diffused light in the room or by autoxidation and so the mechanical strengths of the coating film are expected to become higher as compared with the case of conventional desensitizer.

As known well, the term "drying" as used in the printing industry as well as in this specification pertains to a tack-free state which is brought about by (1) sufficient evaporation of the solvent, (2) sufficient penetration of the ink into paper, (3) solidification of the ink from the liquid state, or (4) combinations of above factors.

Although in the foregoing the merits of this invention are described with respect to photocuring or ultraviolet drying, the utilizable radiant energy incident to the printed surface is not only light (ultraviolet rays), but also an electron beam or a radioactive ray which is easily available nowadays. The present desensitizer exhibits characteristic features also when exposed to such an energy source, indicating the broad range within which the present desensitizer can be satisfactorily used.

Some of the desensitizers according to this invention have been already on the market and are ready for use. Alternatively, they can be prepared according to conventional method by reacting the corresponding ethylenically unsaturated carboxylic acid with the terminal epoxy group of a terminal glycidyl ether compound of the corresponding polyoxyalkylene glycol, bisphenol-A-based epoxy resin prepolymer, etc., which are supplied by chemical companies specialized in fat and oil chemicals; or by the transesterification between an alkylene oxide adduct and an unsaturated carboxylate in the presence of an alkaline catalyst; or by the transesterification between an alkylene oxide adduct and an unsaturated carboxylic acid in the presence of an acid catalyst.

That is, the present desensitizer can be produced by reacting acrylic acid or methacrylic acid with polyoxyethylene glycol or polypropylene glycol which may be interrupted by dioxydiphenylpropane in ether linkage, or glycidyl ether, monoalkylether thereof to form an ester, the polyoxyethylene glycol or polypropylene glycol corresponding to its moiety of the compound of the formula (I).

To summarize characteristic features of the present invention, (1) a remarkable desensitizing effect (ability to prevent color development) on no-carbon pressure-sensitive copy paper or heat-sensitive record paper is exhibited;

(2) no offensive odor is emitted;

(3) no yellow discoloration takes place;

(4) no deterioration in the surface coated with microcapsules occurs;

(5) synthesis is simple and preparation of a high molecular weight desensitizer is easy; and (6) a desensitizer which is ultraviolet-curable (ultraviolet-polymerizable) in itself can be provided.

The invention is illustrated below with reference to Examples. In Examples all parts are by weight.

EXAMPLE 1

A desensitizing ink was prepared by mixing the following components:

|  | Parts |
| --- | --- |
| Compound No. 9 | 50 |
| "Aron KR" (a ketone resin of Toa Gosei Chemical Industry Co.) | 25 |
| Titanium oxide | 25 |

EXAMPLE 2

A desensitizing ink was prepared by mixing the following components:

|  | Parts |
| --- | --- |
| Compound No. 11 | 40 |
| Trimethylolpropane acrylate | 20 |
| Titanium oxide | 40 |

EXAMPLE 3

A desensitizing ink was prepared by mixing the following components:

|  | Parts |
| --- | --- |
| Compound No. 12 | 50 |
| 37 Aron KR" | 25 |
| Titanium oxide | 25 |

EXAMPLE 4

A desensitizing ink was prepared by mixing the following components:

|  | Parts |
| --- | --- |
| Compound No. 24 ("NK ester P-9G" of Shin Nakamura Kagaku Kogyo Co.) | 50 |
| "Aron KR" | 25 |
| Titanium oxide | 25 |

EXAMPLE 5

A desensitizing ink was prepared by mixing the following components:

|  | Parts |
| --- | --- |
| "Aron KR" | 20 |
| Polypropylene glycol (molecular weight, 1,000) | 20 |
| Compound No. 22 ("NK ester 23G" of Shin Nakamura Kagaku Kogyo Co.) | 40 |
| Titanium oxide | 20 |

EXAMPLE 6

A desensitizing ink was prepared by mixing the following components:

|  | Parts |
| --- | --- |
| Compound No. 21 ("NK ester 14G") | 50 |
| "Aron KR" | 25 |
| Titanium oxide | 25 |

EXAMPLE 7

A desensitizing ink was prepared by mixing the following components:

|  | Parts |
| --- | --- |
| Compound No. 22 | 40 |
| Trimethylolpropane trimethacrylate | 20 |
| Titanium oxide | 40 |

EXAMPLE 8

A desensitizing ink was prepared by mixing the following components:

|  | Parts |
| --- | --- |
| Polypropylene glycol diglycidilether diacrylate (The molecular weight of polypropylene glycol moiety is 1500) | 30 |
| "Aron KR" | 20 |
| Compound No. 12 | 30 |
| Titanium oxide | 20 |

EXAMPLE 9

Each of the eight desensitizing inks obtained in Examples 1 to 8 was applied at a rate of about 3 g/m$^2$ to the resin-coated side of the intermediate sheet of a commercial no-carbon pressure-sensitive copy paper and air-dried. The top sheet of the pressure-sensitive copy paper was placed over the intermediate sheet and a marking pressure was applied by means of a typewriter to test the desensitizing effect. It was confirmed that color development on the resin-coated side of the intermediate sheet had been sufficiently prevented and no deterioration was recognizable on the microcapsule-coated side.

EXAMPLE 10

An ink was prepared in a customary way according to the following formulation:

|  | Parts |
| --- | --- |
| A reaction product of an epoxidized soybean oil acrylate and an acrylated isocyanate | 37 |
| Compound No. 7 | 30 |
| Titanium oxide | 20 |

The ink obtained above was printed by a letterpress process on a commercial no-carbon paper (Mitsubishi NCR paper with N-40 resin coated sheet) at a rate of about 3 g/m². Immediately after printing, the ink coating was exposed to ultraviolet rays from an ultraviolet irradiator (made by Tokyo Shibaura Electric Co.), whereby the ink was instantaneously dried. When the amount of ink deposit was increased to 6 g/m², substantially no tackiness was observed. Satisfactory desensitizing effect was exhibited in both cases of ink deposits of 3 g/m² and 6 g/m².

EXAMPLE 11

A desensitizing ink was prepared according to the following composition:

|  | Parts |
| --- | --- |
| A reaction product of an epoxidized soybean oil acrylate and an acrylated isocyanate (a known photocuring resin) | 37 |
| Compound No. 10 | 30 |
| Titanium oxide | 20 |
| Benzoin methyl ether (sensitizer) | 3 |

The ink obtained above was printed by a letterpress process on an intermediate sheet of a commercial no-carbon copy paper (Mitsubishi NCR paper ® N-40resin) (amount of ink deposit, about 3 g/m²). Immediately after printing, on exposure to ultraviolet rays from an ultraviolet irradiator, the ink coating was instantaneously dried. When the amount of ink deposit was increased to 6 g/m², substantially no tackiness was observed. Satisfactory desensitizing effect was exhibited in both cases of ink deposits of 3 g/m² and 6 g/m².

COMPARATIVE EXAMPLE 1

In a manner similar to that in Example 11, an ink was prepared according to the following formulation:

|  | Parts |
| --- | --- |
| A reaction product of an epoxidized soybean oil acrylate and an acrylated isocyanate | 37 |
| N,N,N'-trihydroxyethyl-N'-stearyl-propylenedianine (a known desensitizer) | 30 |
| Titanium oxide | 20 |
| Benzoin methyl ether (sensitizer) | 3 |

The ink obtained above was printed in the same manner as in Example 11. When the amount of ink deposit was 3 g/m², even immediately after exposure to ultraviolet rays, a slight tackiness and yellowing in printed area were observed, though the desensitizing effect was sufficient. When the ink deposit was increased to 6 g/m², tackiness was distinct, migration was observed during storage, and microcapsules on the back of printed side were found to have been ruptured.

What is claimed is:

1. A desensitizing composition for no-carbon copy paper, characterized by comprising a pigment, a vehicle and as desensitizer a compound represented by the formula:

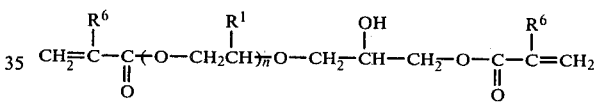

where $R^1$ represents a hydrogen atom or a methyl group and $R^6$ is a hydrogen atom or a methyl group; and n is an integer of 2 to 23.

2. A desensitizing composition for no-carbon copy paper, characterized by comprising a pigment, a vehicle and as desensitizer a compound wherein said compound as desensitizer is represented by the following formula:

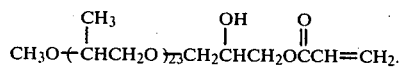

* * * * *